United States Patent
Udupi et al.

(10) Patent No.: US 10,361,935 B2
(45) Date of Patent: Jul. 23, 2019

(54) PROBABILISTIC AND PROACTIVE ALERTING IN STREAMING DATA ENVIRONMENTS

(71) Applicant: Cisco Technology, Inc., San Jose, CA (US)

(72) Inventors: Yathiraj B. Udupi, San Jose, CA (US); Aparupa Das Gupta, San Jose, CA (US); Rahul Ramakrishna, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 209 days.

(21) Appl. No.: 15/420,248

(22) Filed: Jan. 31, 2017

(65) Prior Publication Data
US 2018/0219754 A1    Aug. 2, 2018

(51) Int. Cl.
*H04L 12/26* (2006.01)
*H04L 29/08* (2006.01)
*H04L 12/24* (2006.01)

(52) U.S. Cl.
CPC ............ *H04L 43/08* (2013.01); *H04L 41/147* (2013.01); *H04L 41/16* (2013.01); *H04L 41/5009* (2013.01)

(58) Field of Classification Search
CPC ... H04L 41/16; H04L 41/147; H04L 41/5032; H04L 41/5009; H04L 43/08; H04L 43/04; H04L 43/16
USPC ......................................................... 709/224
See application file for complete search history.

(56) References Cited

U.S. PATENT DOCUMENTS

| 8,255,524 B2 | 8/2012 | Devitt |
| 8,682,812 B1 * | 3/2014 | Ranjan ............... H04L 63/1425 706/12 |
| 9,026,851 B2 | 5/2015 | Mondal et al. |
| 2016/0104076 A1 | 4/2016 | Maheshwari et al. |
| 2016/0203416 A1 * | 7/2016 | Kvernvik ............. G06N 99/005 706/12 |

(Continued)

FOREIGN PATENT DOCUMENTS

WO    WO-2013072232 A1    5/2013

OTHER PUBLICATIONS

Wetzstein, "KPI-Related Monitoring, Analysis, and Adaptation of Business Processes", 2016, semanticscholar.org, pdfs.semanticscholar.org/60c3/a66867285be36717b59caf1494e373878a1a.pdf (Year: 2016).*

(Continued)

*Primary Examiner* — Ruolei Zong
(74) *Attorney, Agent, or Firm* — Behmke Innovation Group LLC; James Behmke; Stephen D. LeBarron (57) ABSTRACT

In one embodiment, a device in a network aggregates values for a set of key performance indicators (KPIs) for a system the network to form a plurality of KPI states. The device associates a plurality of observed performance metric values from the system with the KPI states. The device constructs a machine learning-based decision tree. Internal vertices of the decision tree represent conditions for the plurality of observed performance metric values and leaves of the tree represent the KPI states. The device predicts a KPI state by using the machine learning-based decision tree to analyze live performance metric values streamed from the system. The device generates a proactive alert based on the predicted KPI state.

20 Claims, 9 Drawing Sheets

(56) References Cited

U.S. PATENT DOCUMENTS

| | | | | |
|---|---|---|---|---|
| 2016/0248624 | A1* | 8/2016 | Tapia | H04L 41/5009 |
| 2017/0290024 | A1* | 10/2017 | Ouyang | H04W 72/085 |
| 2017/0310546 | A1* | 10/2017 | Nair | H04L 41/22 |
| 2017/0353361 | A1* | 12/2017 | Chopra | H04L 41/147 |
| 2018/0219753 | A1* | 8/2018 | Arsenie | H04L 43/08 |

OTHER PUBLICATIONS

El-Mongy et al., "Design of Prediction System for Key Performance Indicators in Balanced Scorecard", 2013, International Journal of Computer Applications, vol. 72—No. 8, pdfs.semanticscholar.org/05db/bce3e3dad595997a0c98b60afe6959430f75.pdf (Year: 2013).*

Eleni Rozaki, "Design and Implementation for Automated Network Troubleshooting Using Data Mining", 2015, International Journal of Data Mining & Knowledge Management Process, vol. 5, No. 3, arxiv.org/ftp/arxiv/papers/1506/1506.00108.pdf (Year: 2015).*

Loh, Wei-Yin., "Classification and regression trees", Wiley Interdisciplinary Reviews: Data Mining and Knowledge Discovery 1.1, pp. 14-23, 2011, John Wiley & Sons, Inc.

Wang, et al., "A Streaming Data Anomaly Detection Analytic Engine for Mobile Network Management", IEEE International Conference on Cloud and Big Data Computing, Jul. 2016, 8 pages, IEEE.

"Apdex: Measuring user satisfaction", https://docs.newrelic.com/docs/apm/new-relic-apm/apdex/apdex-measuring-user-satisfaction, New Relic Documentation, Accessed Oct. 14, 2016, 4 pages, New Relic.

"Autoregressive integrated moving average", https://en.wikipedia.org/wiki/autoregressive_integrated_moving_average, 7 pages, Aug. 6, 2016, Wikimedia Foundation, Inc.

"Detection and Handling of State Flapping", https://assets.nagios.com/downloads/nagioscore/docs/nagioscore/3/en/flapping.html, Nagios Core, Accessed on Oct. 14, 2016, 4 pages, Nagios.

* cited by examiner

PROBABILISTIC AND PROACTIVE ALERTING IN STREAMING DATA ENVIRONMENTS

TECHNICAL FIELD

The present disclosure relates generally to computer networks, and, more particularly, to probabilistic and proactive alerting in streaming data environments.

BACKGROUND

Generating alerts is a key function of many monitoring processes for a computerized system. For example, an alert may be sent to a human administrator, e.g., to enact corrective measures, manually. In further cases, an alert may be sent to a computerized supervisor for the system, e.g., to enact corrective measures, automatically. Typically, alerts are both reactive in nature and rely on hardcoded rules to trigger when a given alert is generated. For example, an administrator may create an alerting rule that is triggered whenever memory consumption of the monitored system is greater than 90%.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network aggregates values for a set of key performance indicators (KPIs) for a system the network to form a plurality of KPI states. The device associates a plurality of observed performance metric values from the system with the KPI states. The device constructs a machine learning-based decision tree. Internal vertices of the decision tree represent conditions for the plurality of observed performance metric values and leaves of the tree represent the KPI states. The device predicts a KPI state by using the machine learning-based decision tree to analyze live performance metric values streamed from the system. The device generates a proactive alert based on the predicted KPI state.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
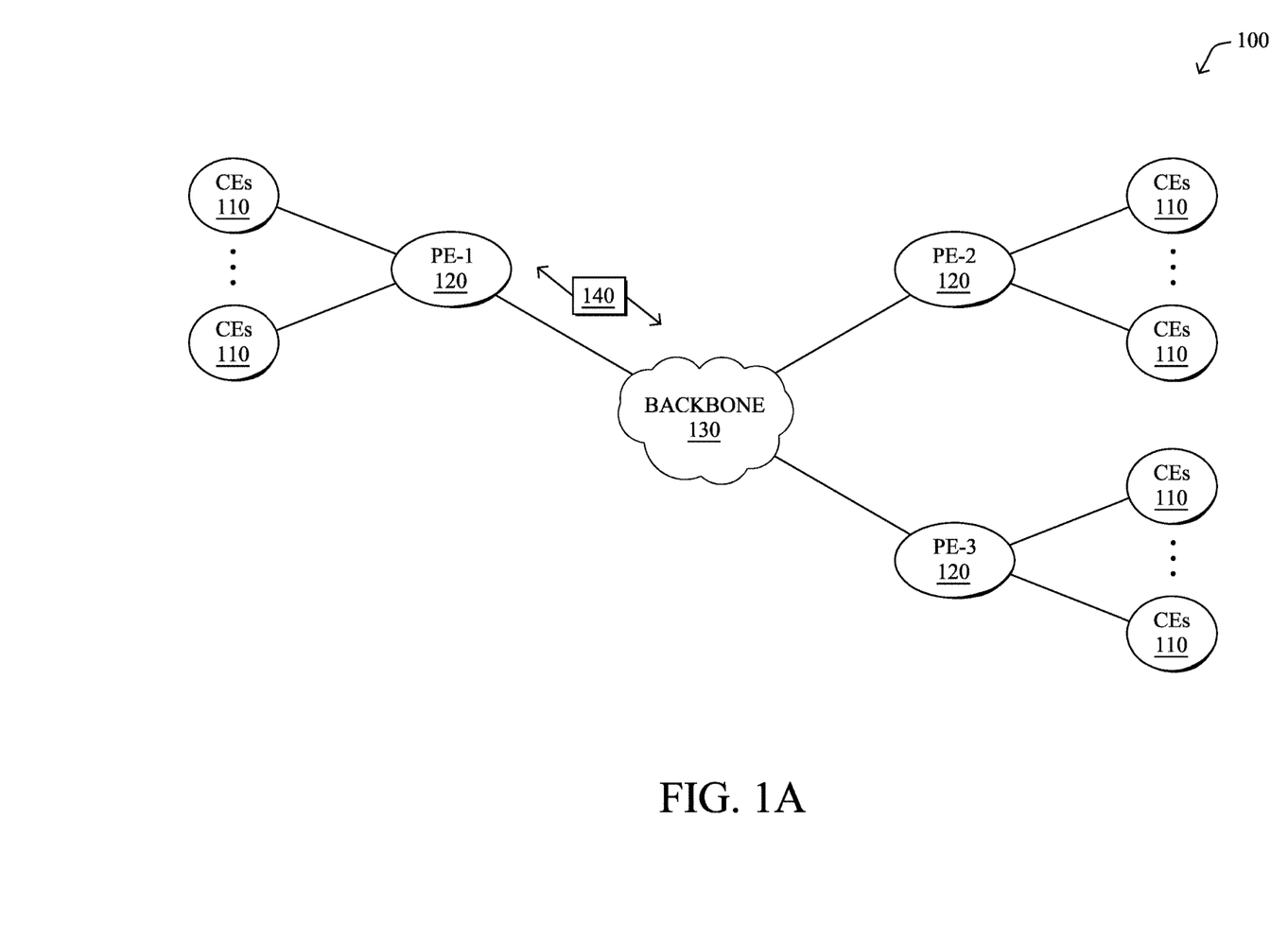
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
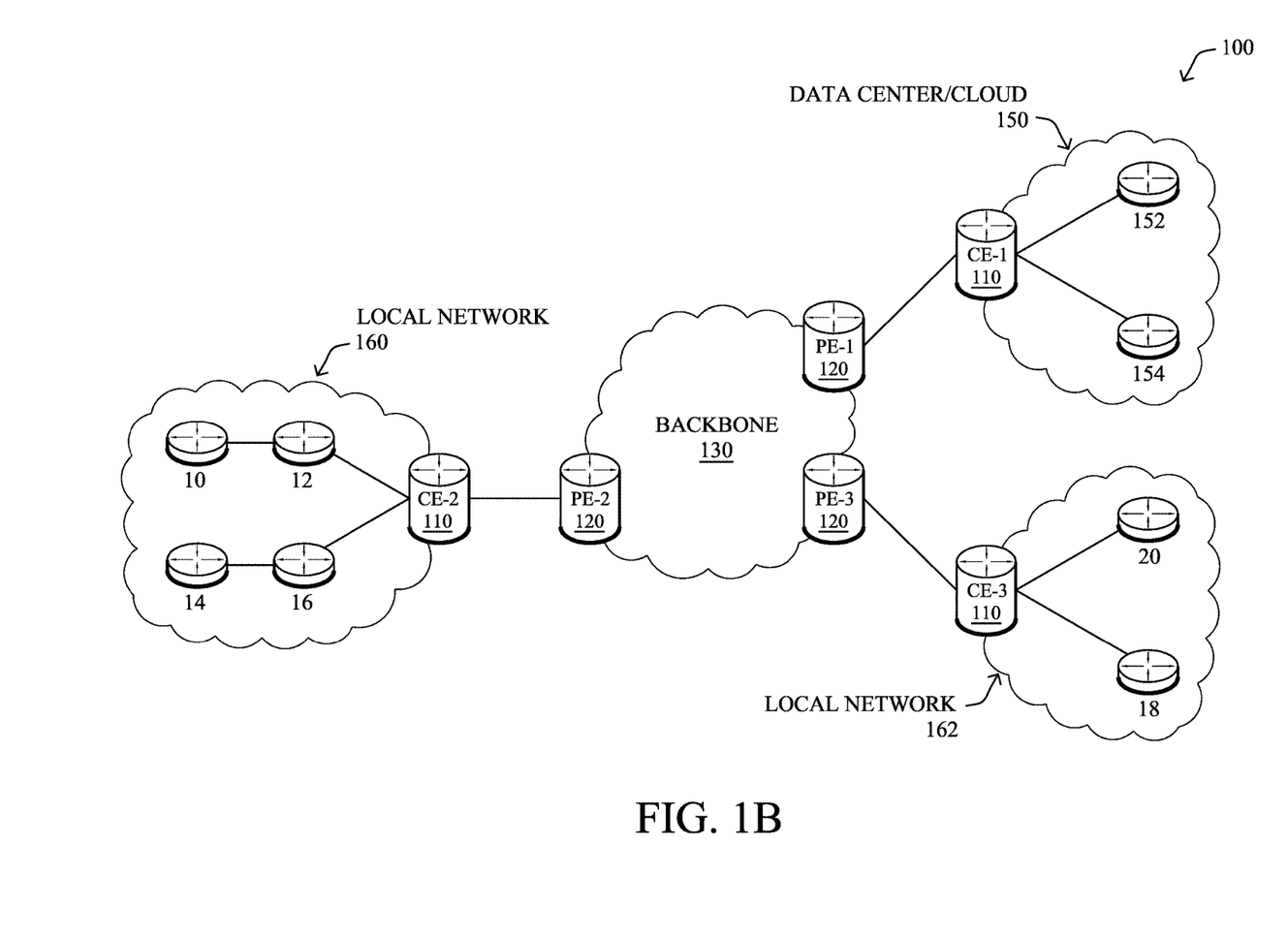

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
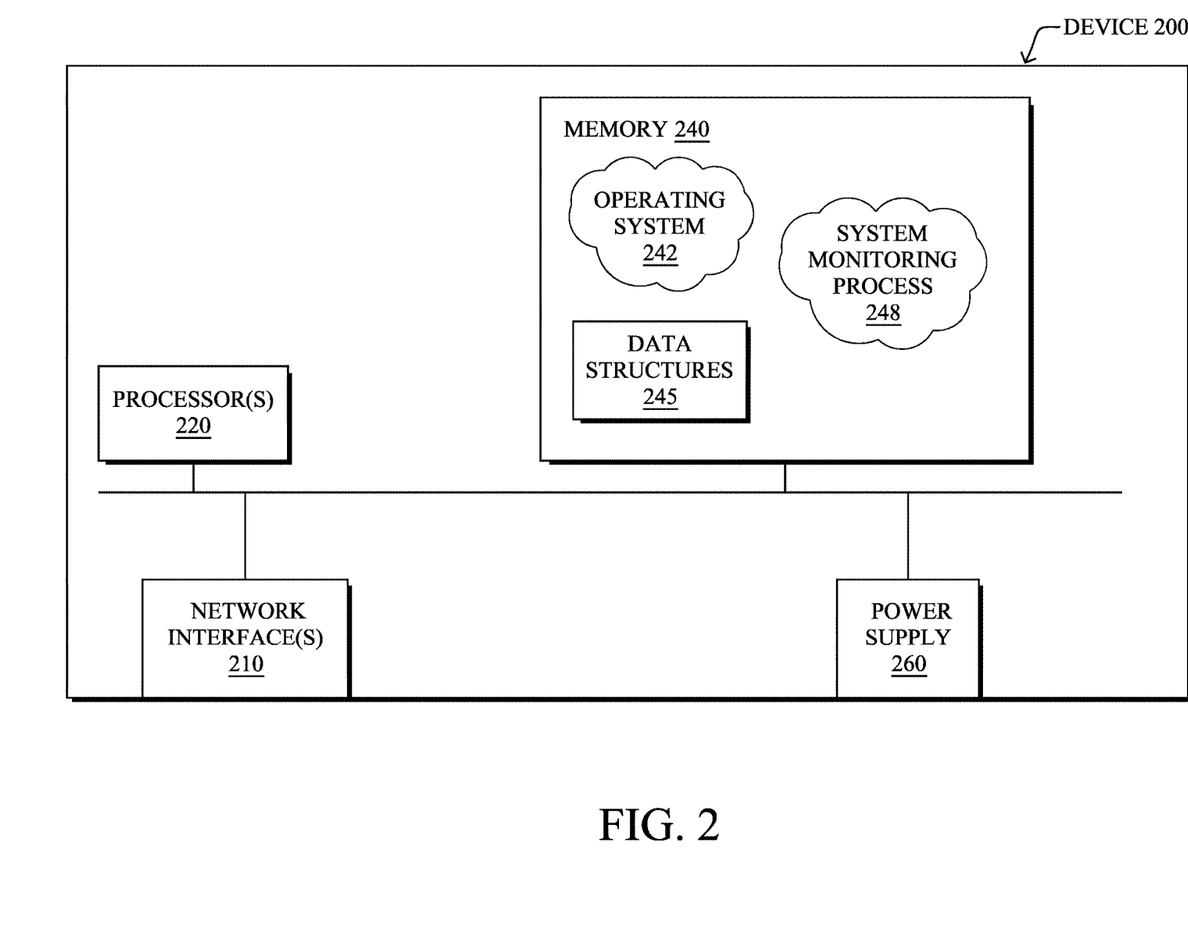
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a system monitoring process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

System monitoring process 248 includes computer executable instructions that, when executed by processor(s) 220, cause device 200 to monitor a system and, based on the monitoring, generate alerts regarding the monitored system. For example, system monitoring process 248 may receive live performance metric values from the system as part of a data stream and, based on its analysis of the incoming values, generate and send an alert to a user interface (e.g., local or remote to device 200) and/or to a supervisory device that oversees the monitored system.

According to various embodiments, system monitoring process 248 may employ any number of machine learning techniques, to assess the operation of the monitored system. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, system monitoring process 248 can use the model M to classify new data points, such as information regarding new traffic flows in the network. Often, M is a statistical model, and the cost function is inversely proportional to the likelihood of M, given the input data.

In various embodiments, system monitoring process 248 may employ one or more supervised, unsupervised, or semi-supervised machine learning models to assess the state of the monitored system. Generally, supervised learning entails the use of a training dataset which is used to train the model to apply labels to the input data. For example, the training data may include sample performance metric values from the monitored system that are considered "normal." On the other end of the spectrum are unsupervised techniques that do not require a training set of labels. Notably, while a supervised learning model may look for previously seen patterns that have been labeled as such, an unsupervised model may instead look to whether there are sudden changes in the behavior of the monitored system. Semi-supervised learning models take a middle ground approach that uses a greatly reduced set of labeled training data to extrapolate this information to unlabeled data, as well.

Example machine learning techniques that system monitoring process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of alerts that incorrectly label the performance of the monitored system as "poor," etc. Conversely, the false negatives of the model may refer to situations in which the model should have generated an alert, but did not (e.g., the model incorrectly believed the operation of the monitored system to be "normal"). True negatives and positives may refer to the situations in which the model correctly generated an alert or deemed the performance of the monitored system "normal." Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, metrics-based performance monitoring typically relies on domain knowledge of the administrator to create rule-based monitoring policies. During operation, these policies may help to alert the administrators when certain key performance indicators (KPIs) are in the danger zone or indicative of a system failure. For example, system KPIs could be measurable performance related metrics such as application latency, end-to-end throughput, simple Boolean values such as whether the system crashed or connections lost, etc.

However, creating rules on the underlying system level metrics can be particularly challenging when there are many underlying system metrics that can be monitored (e.g., tens, hundreds, thousands, etc.). Further, an administrator may not know which metrics play a role in any given KPI. In addition, when there are multiple KPIs, each of the KPIs may behave differently with respect to the underlying metrics.

Also, in many cases, such as in streaming data environment in which the measured performance metrics are live streamed from the monitored system, not all of the underlying system level metrics may be available at any given time. For example, the incoming stream of information about the monitored system may only include certain metrics at a given time, making it difficult to create static alerting rules.

Probabilistic and Proactive Alerting in Streaming Data Environments

The techniques herein introduce an alerting mechanism for streaming data environments that are both probabilistic and proactive. In some aspects, the techniques herein use machine learning to dynamically learn and update proactive alerting rules based on the underlying low-level system metrics and an aggregate system KPI metric that are based on the relevant, customizable system KPIs for the monitored system.

Specifically, according to one or more embodiments of the disclosure as described in detail below, a device in a network aggregates values for a set of key performance indicators (KPIs) for a system the network to form a plurality of KPI states. The device associates a plurality of observed performance metric values from the system with the KPI states. The device constructs a machine learning-based decision tree. Internal vertices of the decision tree represent conditions for the plurality of observed performance metric values and leaves of the tree represent the KPI states. The device predicts a KPI state by using the machine learning-based decision tree to analyze live performance metric values streamed from the system. The device generates a proactive alert based on the predicted KPI state.

Illustratively, the techniques described herein may be performed by hardware, software, and/or firmware, such as in accordance with the system monitoring process 248, which may include computer executable instructions executed by the processor 220 (or independent processor of interfaces 210) to perform functions relating to the techniques described herein.

Operationally, the techniques herein may construct a machine-learning based decision tree that can be used to generate alerts in a proactive and probabilistic manner. Generally, decision trees may be trained to predict the value of a target variable based on several input variables. More specifically, a path from the root node of the tree to a leaf (e.g., the target variable) may determine the predicted target value. When all of the intermediate node variable data values are available, this makes it easy to predict the target value from the tree.

In various embodiments, the techniques herein leverage a machine learning-based decision tree to help build rules that determine whether to generate an alert based on the target value predicted by the tree. As would be appreciated, most decision tree learning techniques rely on static data that is available in its entirety, so that a relevant prediction can be made. In contrast, however, the techniques herein are also able to operate when only partial information about the monitored system is available. Notably, the interim data variable values may only be partially available at any given time, due to the dynamics of the monitored system and/or certain events occurring in different time windows.

Figure 3:
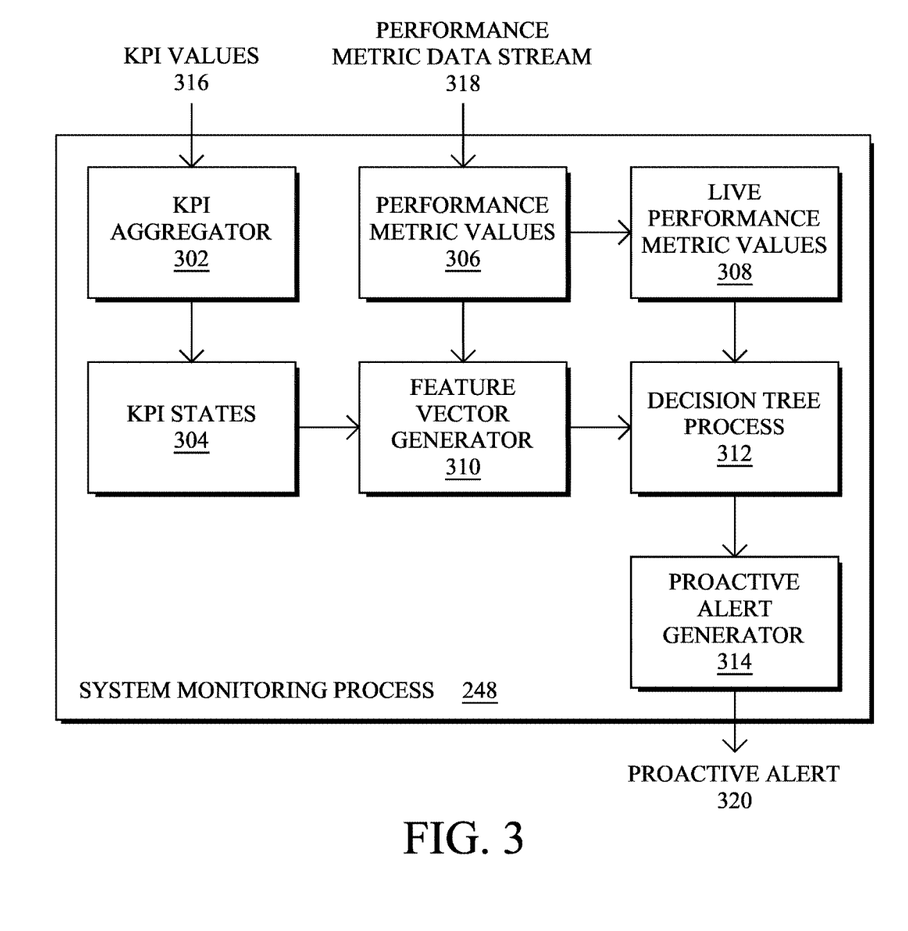
FIG. 3 illustrates an example architecture for generating an alert for a monitored system.

FIG. 3 illustrates an example architecture 300 for generating an alert for a monitored system, according to various embodiments. As shown, system monitoring process 248 may include any number of sub-processes and/or access any number of storage locations, to generate a proactive alert 320. As would be appreciated, the various elements of architecture 300 may be implemented on a single device (e.g., a single device 200) or, alternatively, in a distributed manner across multiple devices. Further, while specific sub-processes and memory locations are shown in architecture 300, their respective functionalities can be combined or incorporated into other elements, as desired.

As shown, system monitoring process 248 may receive any number of KPI values 316 regarding the monitored system. In turn, system monitoring process 248 may execute a KPI aggregator 302 that aggregates KPI values 316 into a set of KPI states 304, according to various embodiments. Generally, KPI aggregator 302 may normalize and aggregate KPI values 316 to classify KPI values 316 into a set of KPI states/classes 304. For example, KPI states 304 may represent "Low," "Medium," and "High" states, which signify the overall severity of the aggregated KPI values 316. In other embodiments, KPI states 304 may include any number of different KPI states (e.g., two states: a "High" and "Low" state, four states: "High," "Medium-High," "Medium-Low," and "Low", etc.).

In some cases, KPI aggregator 302 may receive input from an administrator via a user interface, to assess and rate the KPI values 316 in their aggregate into KPI states 304. For example, an administrator may review KPI values 316 from a given time period and indicate the KPI state, accordingly. In one embodiment, the supplied labels can be used as a training dataset that can then be used to train a machine learning-based classifier in KPI aggregator 302. For example, based on the administrator-supplied labels, KPI aggregator 302 may be trained to assign one of KPI states 304 to the current KPI values 316, dynamically.

System monitoring process 248 may also receive a performance metric data stream 318. In general, data stream 318 may include values for any number of performance metrics from the monitored system. For example, data stream 318 may include values for hardware resource consumption metrics from the monitored system such as, but not limited to, memory consumption, central processing unit (CPU) consumption, input/output (I/O) utilization, etc.

In some cases, data stream 318 may include a continuous stream of measured performance values from the monitored system. Thus, at any given point in time, data stream 318 may only include values for a subset of the full set of performance metrics for the system. Accordingly, system monitoring process 248 may distinguish the "live" performance metric values 308 received via data stream 318 from the overall set of received performance metric values 306. For example, system monitoring process 248 may deem the most recent set of performance metric values in data stream 318 to be "live," and store a history of prior performance metric values, as well.

In various embodiments, system monitoring process 248 may execute a feature vector generator 310 that generates feature vectors based on performance metric values 306 from data stream 318 and their associated KPI states 304. In the context of machine learning, a feature vector generally refers to an n-dimensional vector of observations/features regarding the observed system. For example, assume that the KPI state 304 of "High" is assigned at time or time period $T=t_1$. In such a case, feature vector generator 310 may use the set of performance metric values 306 from this time period, to form a feature vector that includes both the performance metric values, as well as a label for the "High" KPI state.

To perform probabilistic and proactive alerting, system monitoring process 248 may execute a machine learning-based, decision tree process 312. In various embodiments, decision tree process 312 may construct a decision tree using the feature vectors from feature vector generator 310. In turn, decision tree process 312 may use the constructed decision tree to assess live performance metric values 308, to predict a KPI state. In some embodiments, the decision tree may effectively encode a set of decision rules on individual performance metrics that are actually useful in predicting the KPI state.

By constructing a machine learning-based decision tree, decision tree process 312 may achieve what is known as dimensionality reduction on the performance metrics included in performance metric data stream 318. Notably, as the relationships between the underlying performance metrics and the KPI states are often unknown, a machine learning-based decision tree may be able to model the effects of each performance metric on the KPI and ignore those metrics that do not affect the KPI states. For example, consider a dataset from data stream 318 that includes 100 different performance metrics and are labeled with a certain KPI state as reference. In such a case, the resulting decision tree may only assess the 10 metrics from the set that affect the KPI state, thereby reducing the alerting metric space to 1/10 of the original.

Generally, the decision tree constructed by decision tree process 312 may have the following properties:

1.) Inner/parent vertices of the tree may correspond to the reduced set of performance metrics that affect the KPI state (e.g., a condition on the value of the metric);

2.) Leaf vertices of the tree may correspond to the various KPI states; and

3.) A path to any given leaf node in the tree may define a set of rules that can be used to control the generation of alerts.

Decision tree process 312 may thus traverse the constructed tree from the root node to a given leaf node to obtain the complete rule chain of the path, with each sub-rule being a node that indicates a condition on a performance metric value. For example, one rule chain represented by a path in the decision tree may be as follows:

CPU_util>50% AND Mem_util>75% AND Disk>80% AND IO_Rate>70%→KPI-High

From the rule above, it can be seen that there are four sub-rules on the individual, low-level system performance metrics. When these conditions are met, the predicted KPI state is "High," which may indicate that an alert should be generated. The decision tree of decision tree process 312 can also be updated periodically (e.g., nightly, weekly, etc.) or on request, to update the encoded sub-rules, incorporate more or less performance metrics as needed, etc.

Decision tree process 312 may proactively predict the future KPI state in a number of ways. In one embodiment, decision tree process 312 may assess how closely a given rule chain/tree path is satisfied by the live performance metric values 308. For example, as each sub-rule is hit, different alerting mechanisms could be triggered (e.g., if 3 of the 4 sub-rules are satisfied, the system may generate an alert indicating that the KPI state is about to transition to "High."). Here, at each intermediate node, decision tree process 312 may calculate the probability values for the final KPI state/endpoint leaf node. This allows decision tree process 312 to also execute on partial input sets of live performance metric values 308, by assessing the overall probability of the KPI state in view of the known performance metric values.

In another embodiment, decision tree process 312 may use a prediction model to predict values for the 'key' metrics associated with the vertices of the decision tree (e.g., those metrics that may influence the KPI state). For example, decision tree process 312 may use the history of performance metric values 306 to compute a moving average of a time series of observed values from the system such as an Autoregressive Integrated Moving Average (ARIMA) model, or the like. Doing so allow decision tree process 312 to predict future values of the performance metrics, even if the most current value is missing from live performance metric values 308. In turn, decision tree process 312 may evaluate the predicted performance metric values using the decision tree, to determine the predicted KPI state and whether an alerting rule has been triggered.

Based on the evaluation of live performance metric values 308 using the constructed decision tree, decision tree process 312 may notify proactive alert generator 314 of the predicted KPI state and/or the evaluated path/rule in the decision tree. In turn, proactive alert generator 314 may use this information to proactively generate an alert 320 that can be sent to a local or remote user interface (e.g., via the network) and/or to a supervisory device in charge of the monitored system (e.g., to make automatic changes to the system). Alert 320 may also include an indication of the performance metric values that led to the generated rule and/or an indication of the predicted KPI. To determine whether an alert 320 is to be sent, proactive alert generator 314 may consider the sub-rules evaluated along the path of the decision tree, the probability of the predicted KPI state, and/or the predicated KPI state itself. For example, if the KPI state of "High" is predicted with a probability of 85%, proactive alert generator 314 may generate and send an alert 320.

Figure 4:
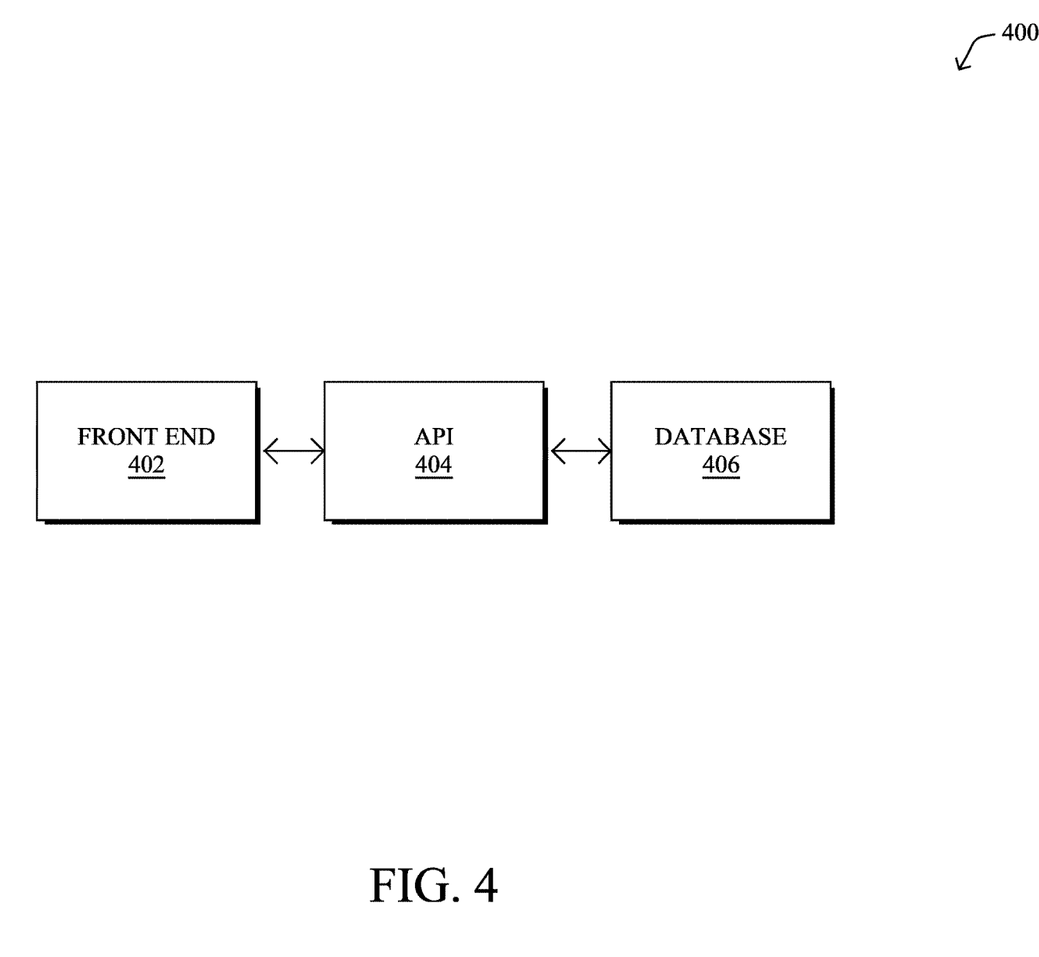
FIG. 4 illustrates an example multi-tiered system.

FIG. 4 illustrates one example of a system 400 that can be monitored using the techniques herein. As shown, system 400 is a multi-tiered system that includes a front end 402 that uses an application program interface (API) 404 to access an underlying database 406. In other words, system 400 may comprise several component services that together impact the overall health of the executing application. In such a case, the KPIs for the application may be a "page response time," an "API response time," an "average latency," etc., which indicate the overall health of system 400. Underlying these KPIs may be any number of performance metrics such as CPU utilization, memory utilization, disk utilization, etc. that may vary over time and can be correlated to the overall system KPIs.

Figure 5A:
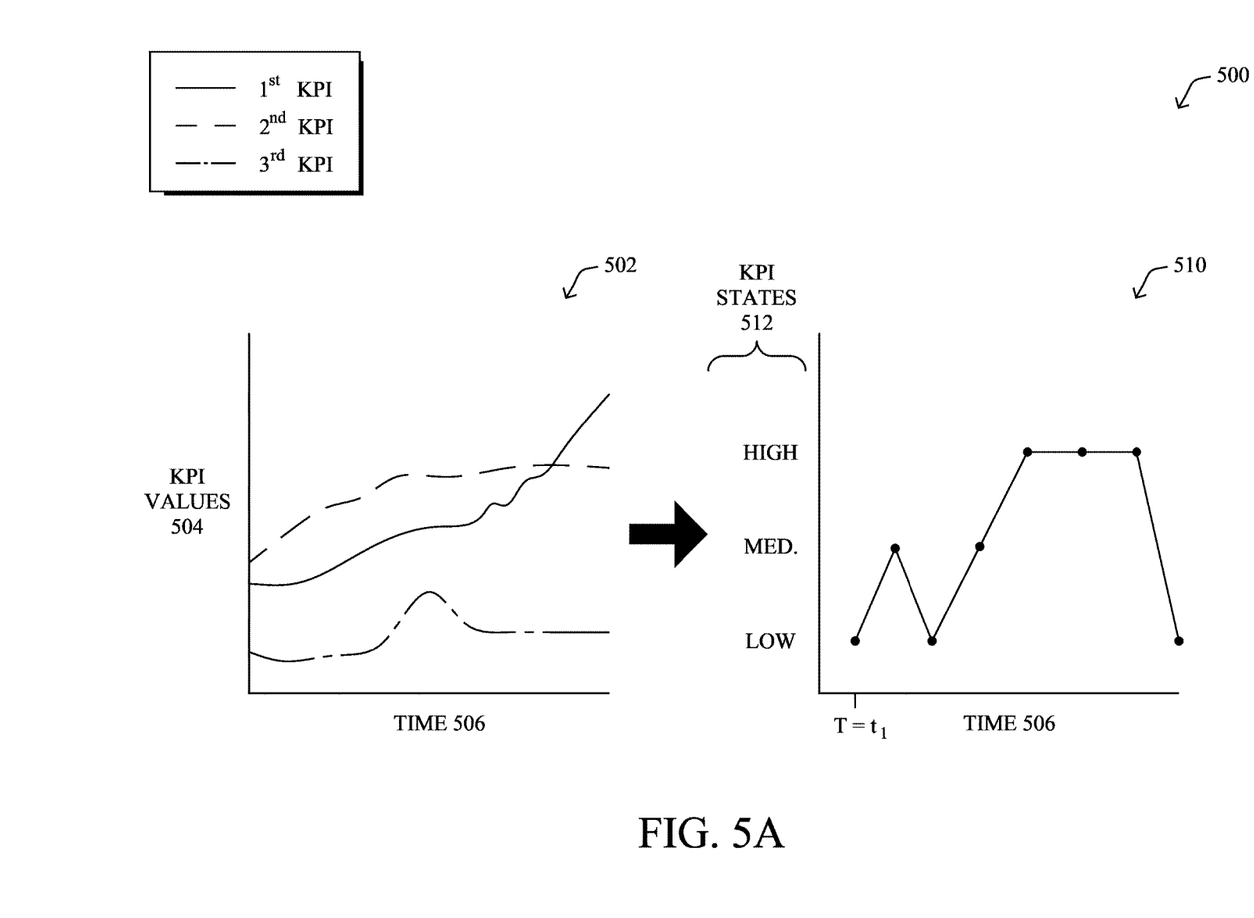
FIGS. 5A-5C illustrate examples of the construction of a decision tree.
Figure 5B:
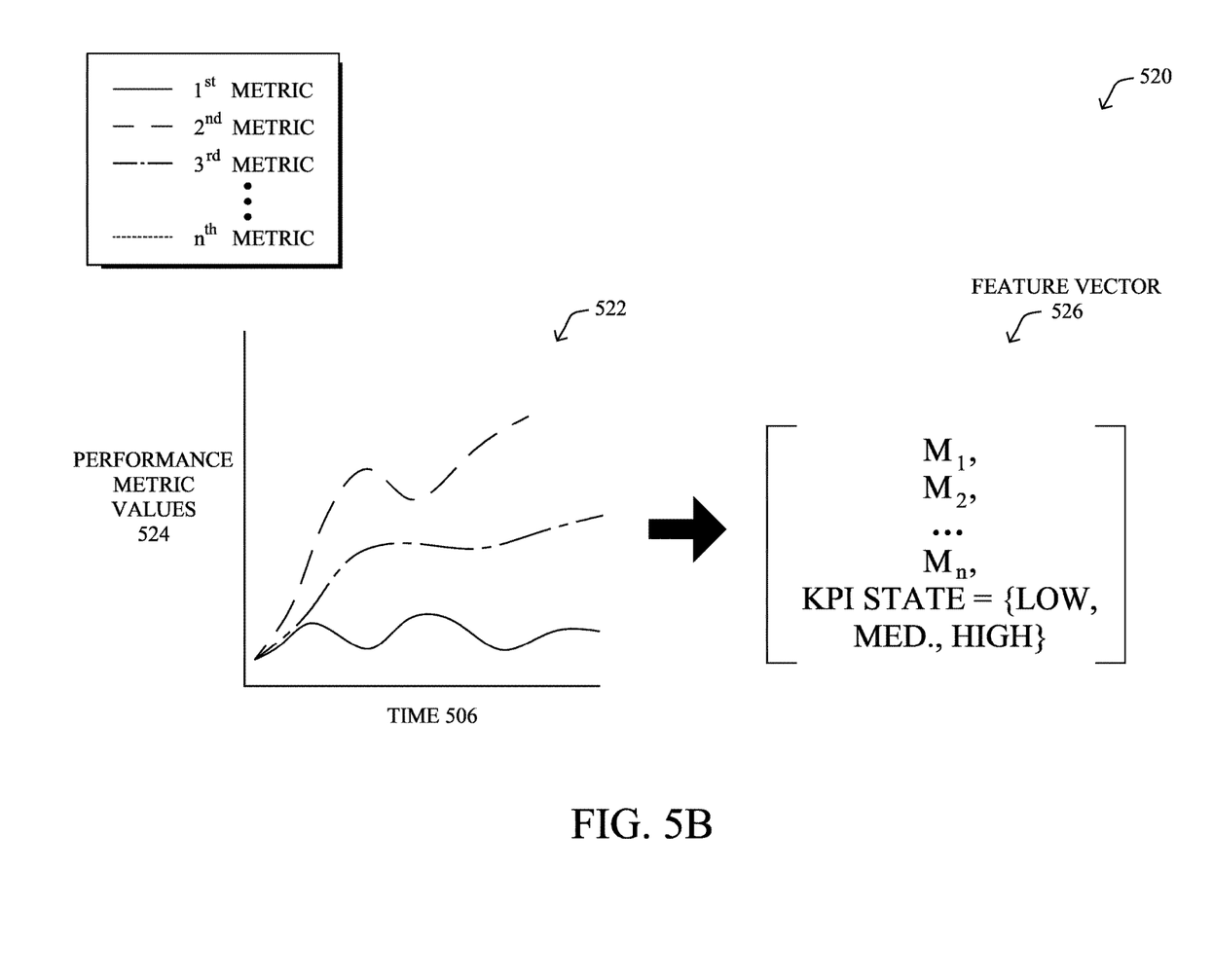
Figure 5C:
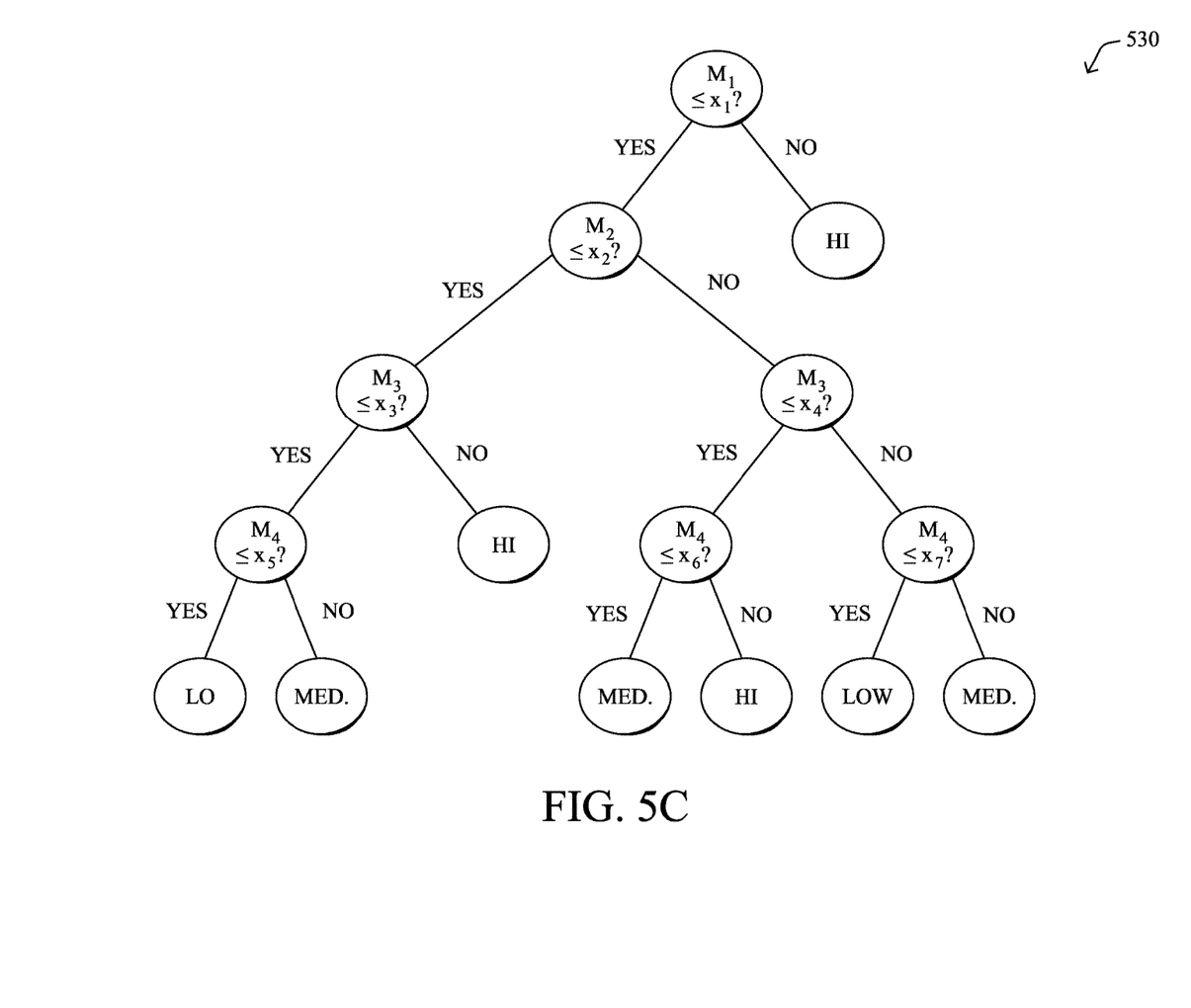

FIGS. 5A-5C illustrate examples of the construction of a decision tree, according to various embodiments. Example 500 shown in FIG. 5A illustrates the aggregation of KPI values into KPI states, such as performed by KPI aggregator 302 of system monitoring process 248. Consider, for example, plot 502 of the values of different KPIs (axis 506) over time (axis 504). Aggregation may entail, for example, mapping the KPI values 504 in any given time period from plot 502 to KPI states (axis 512) as a function of time (axis 506), as shown in plot 510. In other words, for a given time $T=t_1$, the KPI values can be normalized and aggregated into a representative KPI state (e.g., high, medium, or low), accordingly.

FIG. 5B illustrates an example 520 of the generation of a feature vector 526. In addition to assigning KPI states to the aggregated KPI values, as shown in FIG. 5A, the executing device may also receive a data stream of performance metric values, as illustrated in plot 522. As shown, the device may receive values for any number of performance metrics (e.g., a $1^{st}$ through $n^{th}$ metric) (axis 524) as a function of time (axis 506). Notably, plots 502, 510, and 522 may share the same time axis 506, allowing the performance metric values 524 for any specified time to be associated with the corresponding KPI state from plot 510. In turn, these performance metric values and the KPI state label may be associated with one another, to form feature vector 526.

FIG. 5C illustrates an example decision tree 530 that can be constructed based on the set of feature vectors, such as feature vector 526. As shown, the parent/internal vertices of decision tree 530 may represent conditions (e.g., sub-rules) for the various performance metrics that were learned to affect the KPI state. In addition, the leaf vertices of decision tree 530 may represent the various KPI states, high (denoted "HI"), medium (denoted "MED"), and low (denoted "LO"). Accordingly, any given path in decision tree 530 may correspond to a rule that can be used for purposes of generating a proactive alert. For example, if the first metric $M_1$ is predicted to be above a threshold $x_1$, this may indicate a predicted KPI state of "high" and trigger an alert. In another example, an alert may be generated if the values of $M_1$-$M_3$ are less than $x_1$, $x_2$, and $x_3$, respectively, but the value of $M_4$ is predicted to cross $x_5$, thereby predicting a KPI state transition from "low" to "medium" and potentially triggering the generation of an alert.

Figure 6:
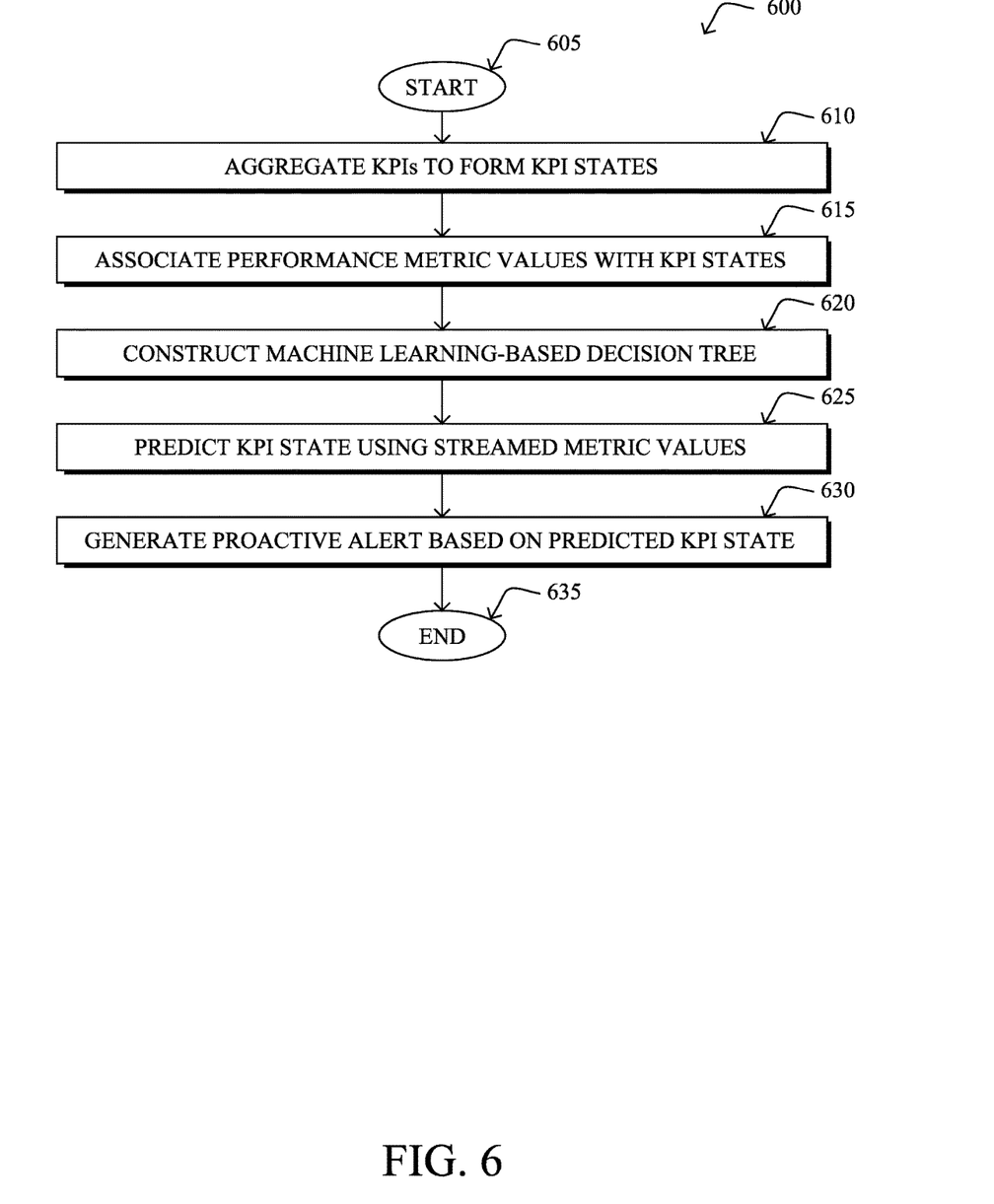
FIG. 6 illustrates an example simplified procedure for generating an alert for a monitored system.

FIG. 6 illustrates an example simplified procedure for generating an alert for a monitored system in a network in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may aggregate KPIs for the monitored system into a set of KPI states. In various embodiments, the KPI states may correspond to low, medium, and high states. In other embodiments, fewer or more KPI states may be used.

At step 615, as detailed above, the device may associate performance metric values from the system to the KPI states. Generally, the performance metric values may be for any number of observed performance metrics and/or calculated therefrom. For example, in some cases, the performance metrics may include metrics regarding the hardware resource usage of the system (e.g., in terms of CPU usage, memory usage, I/O usage, etc.). To associate the performance metric values with the KPI states, in one embodiment, the device may match the KPI state from a given time period to the performance metric values from that same time period. For example, if the KPI state is 'high' at time $T=t_2$, this state can be associated with the performance metric values measured at or around time $T=t_2$.

At step 620, the device may construct a machine learning-based decision tree, as described in greater detail above. Generally, the decision tree relates the KPI states to the performance metric values associated with the KPI values, thereby potentially reducing the dimensionality of the set of values (e.g., by excluding values that do not affect the KPI states from the decision tree). In some embodiments, the internal vertices of the decision tree represent conditions for the plurality of observed performance metric values and leaves of the tree represent the KPI states. Thus, a path in the decision tree may correspond to the evaluation of a rule that comprises any number of sub-rules.

At step 625, as detailed above, the device may predict a KPI state by using the machine learning-based decision tree to analyze live performance metric values streamed from the system. In some embodiments, the device may receive live, streaming data from the monitored system (or an intermediary there between) that includes any number of performance metric values. In turn, the device may use the live streaming metric values to traverse the decision tree to arrive at a predicted KPI state. In some embodiments, the device may predict future values of the performance metrics and use these predictions to traverse the decision tree. For example, the device may calculate an ARIMA-based value from the stream and use this predicted value to evaluate the decision tree. In other cases, the device may assign a probability to each node in the decision tree and, based on the total probability of traversing a path in the tree, predict the most likely KPI state.

At step 630, the device may generate a proactive alert based on the predicted KPI state, as described in greater detail above. For example, if the predicted KPI state indicates that the KPI state will transition from 'medium' to 'high' in the near future, the device may generate a corresponding alert, to proactively notify the appropriate authorities (e.g., to prevent a crash of the monitored system, etc.). In some cases, the device may send the alert to a local or remote user interface, to alert a human administrator. In further cases, the device may send the alert to a supervisory device of the system and/or to the system itself, to cause the performance of one or more automatic mitigation actions. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a reduction in the dimensionality of observed, low-level performance metrics of a monitored system, to obtain the key metrics that affect the KPI state of the system. For example, the techniques herein may be used to construct a machine learning-based decision tree that dynamically generates a set of rules on the key metrics. In further aspects, the constructed decision tree can be used to learn partial rule executions based on partial available data (e.g., based on how many sub-rules are already satisfied in the decision tree model to generate a high KPI state, by using the probability values at intermediate vertices as a way to decide when to alert, etc.). In further cases, the techniques herein can be used to predict future values of the future values of the low-level metrics and apply those values to the decision tree model, to predict the future state of the KPI. The techniques herein can also be used to create alerting rules based on the decision tree (e.g., to identify and prevent critical failure scenarios before they occur).

While there have been shown and described illustrative embodiments that provide for the generation of proactive and deterministic alerts, it is to be understood that various other adaptations and modifications may be made within the spirit and scope of the embodiments herein. For example, while certain embodiments are described herein with respect to using certain machine learning models, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   aggregating, by a device in a network, values for a set of key performance indicators (KPIs) for a system the network to form a plurality of KPI states;
   associating, by the device, a plurality of observed performance metric values from the system with the KPI states;
   constructing, by the device, a machine learning-based decision tree by using feature vectors associated with the plurality of KPI states, wherein internal vertices of the decision tree represent conditions for the plurality of observed performance metric values and leaves of the tree represent the KPI states;
   predicting, by the device, a KPI state of the plurality of KPI states by using the machine learning-based decision tree to analyze live performance metric values streamed from the system, wherein the live performance metric values are associated with the predicted KPI state; and
   generating, by the device, a proactive alert based on the predicted KPI state.

2. The method as in claim 1, wherein the KPI states correspond to low, medium, and high states.

3. The method as in claim 1, wherein the performance metric values comprise hardware resource consumption metrics for the system.

4. The method as in claim 1, further comprising:
   sending, by the device, the proactive alert to a user interface via the network.

5. The method as in claim 1, wherein predicting the KPI state by using the machine learning-based decision tree to analyze the live performance metric values streamed from the system comprises:
   traversing, by the device, a path in the decision tree having vertices that correspond to the live performance metric values and having a leaf that corresponds to the predicted KPI state.

6. The method as in claim 5, wherein the path comprises at least one vertex that does not correspond to at least one of the live performance metric values.

7. The method as in claim 6, wherein the proactive alert is generated based in part on the number of vertices in the path that correspond to the live performance metric values.

8. The method as in claim 5, further comprising:
   using, by the device, the live performance metric values to predict future performance metric values; and
   comparing, by the device, the predicted future performance metric values with the vertices of the path of the decision tree.

9. The method as in claim 1, wherein the KPI indicates at least one of: a page response time, an application program interface (API) response time, or an average latency of the system.

10. An apparatus, comprising:
    one or more network interfaces to communicate with a network;
    a processor coupled to the one or more network interfaces and configured to execute a process; and
    a memory configured to store the process executable by the processor, the process when executed operable to:
       aggregate values for a set of key performance indicators (KPIs) for a system the network to form a plurality of KPI states;
       associate a plurality of observed performance metric values from the system with the KPI states;
       construct a machine learning-based decision tree by using feature vectors associated with the plurality of KPI states, wherein internal vertices of the decision tree represent conditions for the plurality of observed performance metric values and leaves of the tree represent the KPI states;
       predict a KPI state of the plurality of KPI states by using the machine learning-based decision tree to analyze live performance metric values streamed from the system, wherein the live performance metric values are associated with the predicted KPI state; and
       generate a proactive alert based on the predicted KPI state.

11. The apparatus as in claim 10, wherein the KPI states correspond to low, medium, and high states.

12. The apparatus as in claim 10, wherein the performance metric values comprise hardware resource consumption metrics for the system.

13. The apparatus as in claim 10, wherein the process when executed is further operable to:
    send the proactive alert to a user interface via the network.

14. The apparatus as in claim 10, wherein the apparatus predicts the KPI state by:
    traversing a path in the decision tree having vertices that correspond to the live performance metric values and having a leaf that corresponds to the predicted KPI state.

15. The apparatus as in claim 14, wherein the path comprises at least one vertex that does not correspond to at least one of the live performance metric values.

16. The apparatus as in claim 15, wherein the proactive alert is generated based in part on the number of vertices in the path that correspond to the live performance metric values.

17. The apparatus as in claim 14, wherein the process when executed is further operable to:
    use the live performance metric values to predict future performance metric values; and
    compare the predicted future performance metric values with the vertices of the path of the decision tree.

18. The apparatus as in claim 10, wherein the KPI indicates at least one of: a page response time, an application program interface (API) response time, or an average latency of the system.

19. A tangible, non-transitory, computer-readable medium storing program instructions that, when executed by a device in a network, cause the device to perform a process comprising:

aggregating, by the device, values for a set of key performance indicators (KPIs) a system the network to form a plurality of KPI states;

associating, by the device, a plurality of observed performance metric values from the system with the KPI states;

constructing, by the device, a machine learning-based decision tree by using feature vectors associated with the plurality of KPI states, wherein internal vertices of the decision tree represent conditions for the plurality of observed performance metric values and leaves of the tree represent the KPI states;

predicting, by the device, a KPI state of the plurality of KPI states by using the machine learning-based decision tree to analyze live performance metric values streamed from the system, wherein the live performance metric values are associated with the predicted KPI state; and generating, by the device, a proactive alert based on the predicted KPI state.

20. The computer-readable medium as in claim 19, wherein the KPI states correspond to low, medium, and high states.

\* \* \* \* \*